United States Patent
Demir et al.

(10) Patent No.: US 7,444,144 B2
(45) Date of Patent: Oct. 28, 2008

(54) INITIAL CELL SEARCH IN WIRELESS COMMUNICATION SYSTEMS

(75) Inventors: Alpaslan Demir, Commack, NY (US); Donald M. Grieco, Manhassett, NY (US); John W. Haim, Baldwin, NY (US); Andrew F. Bednarz, Garden City, NY (US); Philip J. Pietraski, Huntington Station, NY (US); Louis J. Guccione, East Chester, NY (US); Prabhakar R. Chitrapu, Blue Bell, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 661 days.

(21) Appl. No.: 10/772,644

(22) Filed: Feb. 5, 2004

(65) Prior Publication Data

US 2004/0248602 A1 Dec. 9, 2004

Related U.S. Application Data

(60) Provisional application No. 60/445,331, filed on Feb. 5, 2003.

(51) Int. Cl.
*H04Q 7/20* (2006.01)
*H04J 3/06* (2006.01)
*H04B 1/00* (2006.01)

(52) U.S. Cl. ............. 455/422.1; 455/423; 455/425; 370/503; 370/506; 370/509; 370/514; 375/149

(58) Field of Classification Search ......... 455/422.1, 455/423, 425; 370/503, 506, 509–514; 375/149
See application file for complete search history.

(56) References Cited

U.S. PATENT DOCUMENTS

| 5,696,766 | A  | 12/1997 | Yeung et al. |
| 6,028,868 | A  | 2/2000  | Yeung et al. |
| 6,084,871 | A  | 7/2000  | Engstrom et al. |
| 6,185,244 | B1 | 2/2001  | Nystrom et al. |
| 6,246,673 | B1 | 6/2001  | Tiedemann, Jr. et al. |
| 6,363,060 | B1 | 3/2002  | Sarkar |
| 6,603,735 | B1 | 8/2003  | Park et al. |

(Continued)

FOREIGN PATENT DOCUMENTS

EP         1128565         8/2001

(Continued)

OTHER PUBLICATIONS

Interdigital Communications Corporation, "A BPSK Modulated Secondary Synchronization Codes Based Cell Search in UTRA TDD," TSGR1#5(99) 578, Cheju, S. Korea (Jun. 1-4, 1999).

(Continued)

*Primary Examiner*—Matthew Anderson
*Assistant Examiner*—Wen W Huang
(74) *Attorney, Agent, or Firm*—Volpe and Koenig, P.C.

(57) ABSTRACT

A method and system for performing initial cell search is disclosed. Step 1 processing is preformed to detect a peak primary synchronization code (PSC) location (i.e. chip offset or chip location). Step 2 processing is performed to obtain the $t_{offset}$ and code group. Step 3 processing is performed to identify the midamble of a base station with which the WTRU performing the initial cell search may synchronize with.

6 Claims, 6 Drawing Sheets

U.S. PATENT DOCUMENTS

| | | | |
|---|---|---|---|
| 7,035,284 B2* | 4/2006 | Willenegger et al. | 370/470 |
| 7,173,992 B2* | 2/2007 | Frigon | 375/354 |
| 7,194,011 B1* | 3/2007 | Nassiri-Toussi et al. | 370/503 |
| 2002/0146039 A1 | 10/2002 | Demir et al. | |
| 2003/0119444 A1* | 6/2003 | Yamaguchi | 455/21 |
| 2003/0220755 A1* | 11/2003 | Darbel et al. | 702/89 |
| 2004/0057468 A1* | 3/2004 | Shieh et al. | 370/514 |

FOREIGN PATENT DOCUMENTS

| | | |
|---|---|---|
| WO | 01/22623 | 3/2001 |
| WO | 02/13548 | 2/2002 |
| WO | 02/069551 | 9/2002 |
| WO | 03/001711 | 1/2003 |

OTHER PUBLICATIONS

Siemens and Texas Instruments, "Generalized Hierarchical Golay Sequence for PSC with Low Complexity Correlation Using Pruned Efficient Golay Correlators," Tdoc TSGR1#5(99) 554, Cheju, S. Korea (Jun 1-4, 1999).

Texas Instruments, "Comma Free Codes for Fast PN Code Acquisition in WCDMA Systems: A Proposal for the UTRA Concept," Tdoc SMG2 UMTS-L1 72/98, Paris, France (Apr. 28, 1998).

Texas Instruments, "A New Comma Free Code Scheme for TDD Synchronization," TSGR1#6(99) 815, Espoo, Finland (Jul. 13-16, 1999).

Texas Instruments, "Secondary Synchronization Codes (SSC) Corresponding to the Generalized Hierarchical Golay (GHG) PSC," TSGR1#5(99) 574, Cheju, S. Korea (Jun. 1-4, 1999).

Texas Instruments and Interdigital Communications Corporation, "Modulated Length-2 and Length-4 Comma Free Codes with Greater Minimum Distance," Tdoc TSGR1#7(99) b01, Hanover, Germany (Aug. 30-Sep. 3, 1999).

Third Generation Partnership Project, "Technical Specification Group Radio Access Networks; UE Radio Transmission and Reception (TDD) (Release 1999)," 3GPP TS 25.102 v3.12.0 (Sep. 2002).

Third Generation Partnership Project, "Technical Specification Group Radio Access Networks; UE Radio Transmission and Reception (TDD) (Release 4)," 3GPP TS 25.102 v4.7.0 (Dec. 2002).

Third Generation Partnership Project, "Technical Specification Group Radio Access Networks; UE Radio Transmission and Reception (TDD) (Release 5)," 3GPP TS 25.102 v5.0.1 (Mar. 2002).

Third Generation Partnership Project, "Technical Specification Group Radio Access Networks; UE Radio Transmission and Reception (TDD) (Release 5)," 3GPP TS 25.102 v5.3.0 (Dec. 2002).

Third Generation Partnership Project, "Technical Specification Group Radio Access Networks; UE Radio Transmission and Reception (TDD) (Release 5)," 3GPP TS 25.102 v5.6.0 (Dec. 2003).

Third Generation Partnership Project, "Technical Specification Group Radio Access Networks; UE Radio Transmission and Reception (TDD) (Release 6)," 3GPP TS 25.102 v6.0.0 (Dec. 2003).

Third Generation Partnership Project, "Technical Specification Group Radio Access Network; Physical Channels and Mapping of Transport Channels onto Physical Channels (FDD) (Release 99)," 3GPP TS 25.211 v3.12.0 (Sep. 2002).

Third Generation Partnership Project, "Technical Specification Group Radio Access Network; Physical Channels and Mapping of Transport Channels onto Physical Channels (FDD) (Release 4)," 3GPP TS 25.211 v4.6.0 (Sep. 2002).

Third Generation Partnership Project, "Technical Specification Group Radio Access Network; Physical Channels and Mapping of Transport Channels onto Physical Channels (FDD) (Release 5)," 3GPP TS 25.211 v5.2.0 (Sep. 2002).

Third Generation Partnership Project, "Technical Specification Group Radio Access Network; Physical Channels and Mapping of Transport Channels onto Physical Channels (FDD) (Release 5)," 3GPP TS 25.211 v5.3.0 (Dec. 2002).

Third Generation Partnership Project, "Technical Specification Group Radio Access Network; Physical Channels and Mapping of Transport Channels onto Physical Channels (FDD) (Release 5)," 3GPP TS 25.211 v5.5.0 (Sep. 2003).

Third Generation Partnership Project, "Technical Specification Group Radio Access Network; Physical Channels and Mapping of Transport Channels onto Physical Channels (FDD) (Release 6)," 3GPP TS 25.211 v6.0.0 (Dec. 2003).

Third Generation Partnership Project, "Technical Specification Group Radio Access Network; Physical Channels and Mapping of Transport Channels onto Physical Channels (TDD) (Release 1999)," 3GPP TS 25.221 v3.11.0 (Sep. 2002).

Third Generation Partnership Project, "Technical Specification Group Radio Access Network; Physical Channels and Mapping of Transport Channels onto Physical Channels (TDD) (Release 6)," 3GPP TS 25.221 v6.0.0 (Dec. 2003).

Third Generation Partnership Project, "Technical Specification Group Radio Access Network; Spreading and Modulation (TDD) (Release 1999)," 3GPP TS 25.223 v3.8.0 (Mar. 2002).

Third Generation Partnership Project, "Technical Specification Group Radio Access Network; Spreading and Modulation (TDD) (Release 4)," 3GPP TS 25.223 v4.1.0 (Jun. 2001).

Third Generation Partnership Project, "Technical Specification Group Radio Access Network; Spreading and Modulation (TDD) (Release 4)," 3GPP TS 25.223 v4.5.0 (Dec. 2002).

Third Generation Partnership Project, "Technical Specification Group Radio Access Network; Spreading and Modulation (TDD) (Release 5)," 3GPP TS 25.223 v5.2.0 (Dec. 2002).

Third Generation Partnership Project, "Technical Specification Group Radio Access Network; Spreading and Modulation (TDD) (Release 5)," 3GPP TS 25.223 v5.3.0 (Mar. 2003).

Third Generation Partnership Project, "Technical Specification Group Radio Access Network; Spreading and Modulation (TDD) (Release 6)," 3GPP TS 25.223 v6.0.0 (Dec. 2003).

Third Generation Partnership Project, "Technical Specification Group Radio Access Network; Physical Layer Procedures (TDD) (Release 1999)," 3GPP TS 25.224 v3.12.0 (Dec. 2002).

Third Generation Partnership Project, "Technical Specification Group Radio Access Network; Physical Layer Procedures (TDD) (Release 1999)," 3GPP TS 25.224 v3.13.0 (Sep. 2003).

Third Generation Partnership Project, "Technical Specification Group Radio Access Network; Physical Layer Procedures (TDD) (Release 4)," 3GPP TS 25.224 v4.1.0 (Jun. 2001).

Third Generation Partnership Project, "Technical Specification Group Radio Access Network; Physical Layer Procedures (TDD) (Release 4)," 3GPP TS 25.224 v4.7.0 (Dec. 2002).

Third Generation Partnership Project, "Technical Specification Group Radio Access Network; Physical Layer Procedures (TDD) (Release 4)," 3GPP TS 25.224 v4.10.0 (Dec. 2003).

Third Generation Partnership Project, "Technical Specification Group Radio Access Network; Physical Layer Procedures (TDD) (Release 5)," 3GPP TS 25.224 v5.3.0 (Dec. 2002).

Third Generation Partnership Project, "Technical Specification Group Radio Access Network; Physical Layer Procedures (TDD) (Release 5)," 3GPP TS 25.224 v5.7.0 (Dec. 2003).

Third Generation Partnership Project, "Technical Specification Group Radio Access Network; Physical Layer Procedures (TDD) (Release 6)," 3GPP TS 25.224 v6.0.0 (Dec. 2003).

Third Generation Partnership Project, "Technical Specification Group Radio Access Network; Physical Channels and Mapping of Transport Channels onto Physical Channels (FDD) (Release 1999)," 3GPP TS 25.221 v3.11.0 (Sep. 2002).

Third Generation Partnership Project, "Technical Specification Group Radio Access Network; Physical Channels and Mapping of Transport Channels onto Physical Channels (FDD) (Release 4)," 3GPP TS 25.221 v4.1.0 (Jul. 2001).

Third Generation Partnership Project, "Technical Specification Group Radio Access Network; Physical Channels and Mapping of Transport Channels onto Physical Channels (FDD) (Release 4)," 3GPP TS 25.221 v4.7.0 (Dec. 2002).

Third Generation Partnership Project, "Technical Specification Group Radio Access Network; Physical Channels and Mapping of Transport Channels onto Physical Channels (FDD) (Release 5)," 3GPP TS 25.221 v5.3.0 (Dec. 2002).

Third Generation Partnership Project, "Technical Specification Group Radio Access Network; Physical Channels and Mapping of Transport Channels onto Physical Channels (FDD) (Release 5)," 3GPP TS 25.221 v5.5.0 (Jun. 2003).

Third Generation Partnership Project, "Technical Specification Group Radio Access Network; Physical Layer Procedures (TDD) (Release 5)," 3GPP TS 25.224 v5.3.0 (Dec. 2002).

* cited by examiner

INITIAL CELL SEARCH IN WIRELESS COMMUNICATION SYSTEMS

CROSS REFERENCE TO RELATED APPLICATION(S)

This application claims priority from U.S. provisional application No. 60/445,331 filed on Feb. 5, 2003, which is incorporated by reference as if fully set forth.

FIELD OF INVENTION

The present invention generally relates to wireless transmit/receive unit (WTRU) synchronization to a base station. More particularly, the present invention relates to an improved initial cell search process.

BACKGROUND

Wireless telecommunication systems are well known in the art. In order to provide global connectivity for wireless systems, standards have been developed and are being implemented. One current standard in widespread use is known as Global System for Mobile Telecommunications (GSM). This is considered as a so-called Second Generation mobile radio system standard (2G) and was followed by its revision (2.5G). GPRS and EDGE are examples of 2.5G technologies that offer relatively high speed data service on top of (2G) GSM networks. Each one of these standards sought to improve upon the prior standard with additional features and enhancements. In January 1998, the European Telecommunications Standard Institute—Special Mobile Group (ETSI SMG) agreed on a radio access scheme for Third Generation Radio Systems called Universal Mobile Telecommunications Systems (UMTS). To further implement the UMTS standard, the Third Generation Partnership Project (3GPP) was formed in December 1998. 3GPP continues to work on a common third generational mobile radio standard.

Figure 1A:
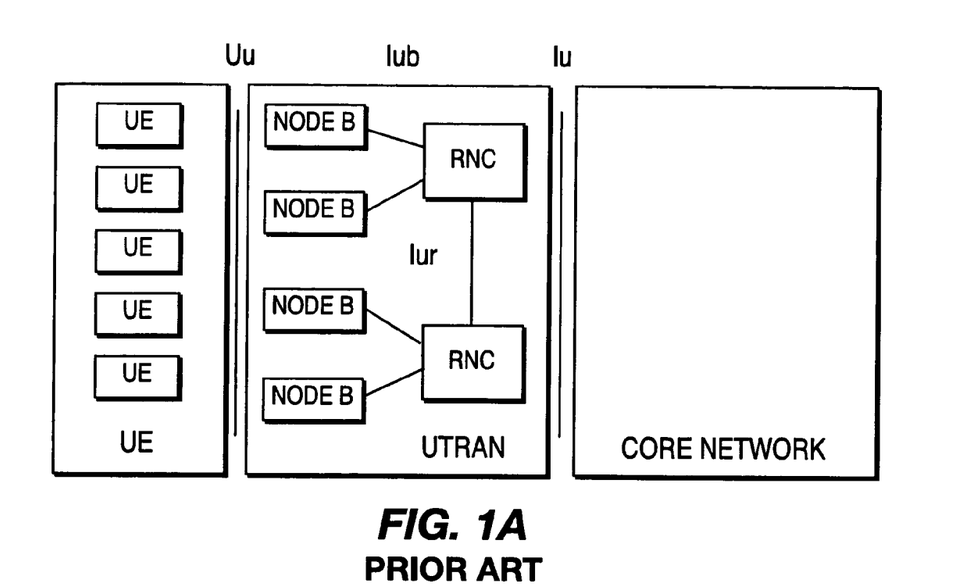
FIG. 1A is an illustration of a typical wireless communication system.

A typical UMTS system architecture in accordance with current 3GPP specifications is depicted in FIG. 1A. The UMTS network architecture includes a Core Network (CN) interconnected with a UMTS Terrestrial Radio Access Network (UTRAN) via an interface known as Iu which is defined in detail in the current publicly available 3GPP specification documents. The UTRAN is configured to provide wireless telecommunication services to users through wireless transmit receive units (WTRUs), known as User Equipments (UEs) in 3GPP, via a radio interface known as Uu. The UTRAN has one or more Radio Network Controllers (RNCs) and base stations, known as Node Bs in 3GPP, which collectively provide for the geographic coverage for wireless communications with UEs. One or more Node Bs are connected to each RNC via an interface known as Iub in 3GPP. The UTRAN may have several groups of Node Bs connected to different RNCs; two are shown in the example depicted in FIG. 1A. Where more than one RNC is provided in a UTRAN, inter-RNC communication is performed via an Iur interface.

Communications external to the network components are performed by the Node Bs on a user level via the Uu interface and the CN on a network level via various CN connections to external systems.

In general, the primary function of base stations, such as Node Bs, is to provide a radio connection between the base stations' network and the WTRUs. Typically a base station emits common channel signals allowing non-connected WTRUs to become synchronized with the base station's timing. In 3GPP, a Node B performs the physical radio connection with the UEs. The Node B receives signals over the Iub interface from the RNC that control the radio signals transmitted by the Node B over the Uu interface.

A CN is responsible for routing information to its correct destination. For example, the CN may route voice traffic from a UE that is received by the UMTS via one of the Node Bs to a public switched telephone network (PSTN) or packet data destined for the Internet. In 3GPP, the CN has six major components: 1) a serving General Packet Radio Service (GPRS) support node; 2) a gateway GPRS support node; 3) a border gateway; 4) a visitor location register; 5) a mobile services switching center; and 6) a gateway mobile services switching center. The serving GPRS support node provides access to packet switched domains, such as the Internet. The gateway GPRS support node is a gateway node for connections to other networks. All data traffic going to other operator's networks or the internet goes through the gateway GPRS support node. The border gateway acts as a firewall to prevent attacks by intruders outside the network on subscribers within the network realm. The visitor location register is a current serving networks 'copy' of subscriber data needed to provide services. This information initially comes from a database which administers mobile subscribers. The mobile services switching center is in charge of 'circuit switched' connections from UMTS terminals to the network. The gateway mobile services switching center implements routing functions required based on current location of subscribers. The gateway mobile services also receives and administers connection requests from subscribers from external networks.

The RNCs generally control internal functions of the UTRAN. The RNCs also provides intermediary services for communications having a local component via a Uu interface connection with a Node B and an external service component via a connection between the CN and an external system, for example overseas calls made from a cell phone in a domestic UMTS.

Typically a RNC oversees multiple base stations, manages radio resources within the geographic area of wireless radio service coverage serviced by the Node Bs and controls the physical radio resources for the Uu interface. In 3GPP, the Iu interface of an RNC provides two connections to the CN: one to a packet switched domain and the other to a circuit switched domain. Other important functions of the RNCs include confidentiality and integrity protection.

In communication systems such as Third Generation Partnership Project (3GPP) Time Division Duplex (TDD) and Frequency Division Duplex (FDD) systems, multiple shared and dedicated channels of variable rate data are combined for transmission. Background specification data for such systems are publicly available and continue to be developed.

Figure 1B:
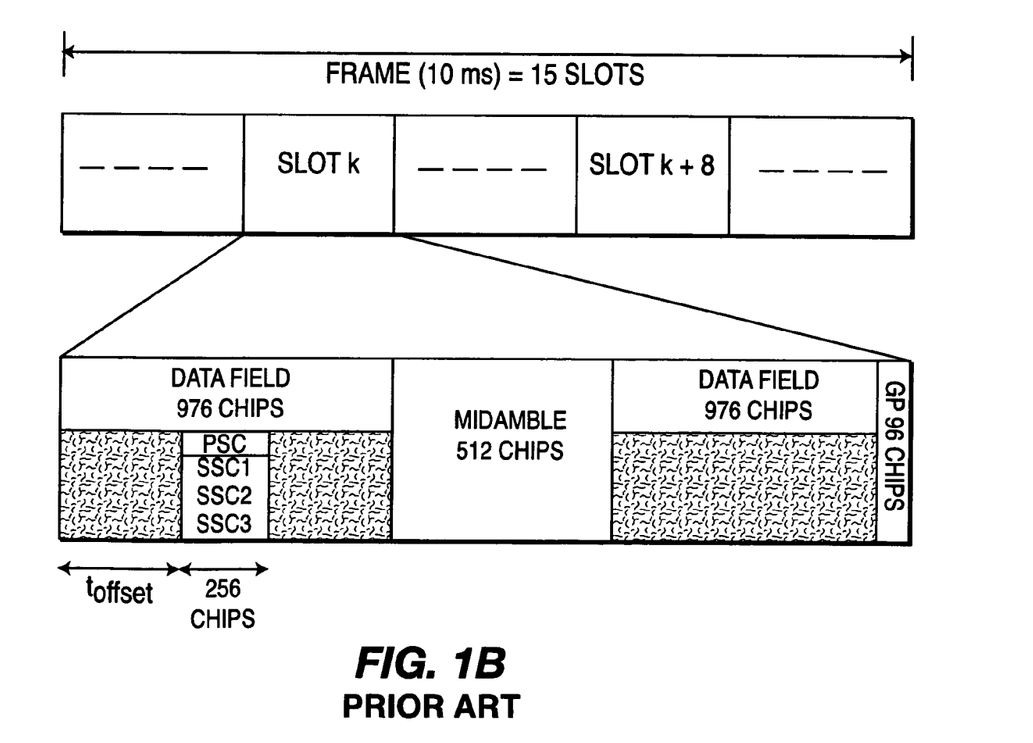
FIG. 1B is an illustration of the physical synchronization channel (PSCH).

Initial cell search processes are used to synchronize the WTRU to a base station. The WTRU accomplishes this procedure via a common downlink channel called the physical synchronization channel (PSCH). Referring to FIG. 1B, the PSCH has a structure wherein the same primary synchronization code (PSC) and complex modulated three secondary synchronization codes (SSC) based on the group number are transmitted with a $t_{offset}$ in respect to the beginning of slots k or k and k+8, The three complex modulated SSCs are chosen with respect to group number. As an example, in a one hundred twenty eight (128) cell system, there are thirty two (32) groups. In each group, the modulation patterns and code combination of the SSCs are different. Four basic midamble codes are associated with each code group. As a result, there are one hundred twenty eight (128) basic midamble codes.

Each cell, of a one hundred twenty eight (128) system, is assigned a group such that no one group is used by more than one cell in a given reception area.

Therefore the cell search synchronization systems determine the scrambling code of a cell utilizing an initial cell search process. Common initial cell search processes utilize three (3) major processes: a step 1 process detects the PSC and determines a chip offset; a step 2 process uses the information given by step 1 and detects the $t_{offset}$ and code group number; and a step 3 process utilizes the information provided by the step 2 process and detects the basic midamble code. It is noted that a startup automatic frequency control (AFC) algorithm is run to reduce the frequency offset between a WTRU and a base station.

Although initial cell search is currently performed in wireless communications, there is a need for an improved method and system for performing initial cell search.

SUMMARY

The present invention is a method and system for performing initial cell search. Step 1 processing is preformed on even and odd samples to detect a peak primary synchronization code (PSC) location (i.e. chip offset or chip location). Step 2 processing is performed to obtain the $t_{offset}$ and code group. Step 3 processing is performed to identify the midamble of a base station with which the WTRU performing the initial cell search may synchronize with.

DETAILED DESCRIPTION OF THE PREFERRED EMBODIMENT(S)

Herein, a wireless transmit/receive unit (WTRU) includes but is not limited to a user equipment, mobile station, fixed or mobile subscriber unit, pager, or any other type of device capable of operating in a wireless environment. When referred to herein, a base station includes but is not limited to a Node-B, site controller, access point or any other type of interfacing device in a wireless environment.

Figure 2:
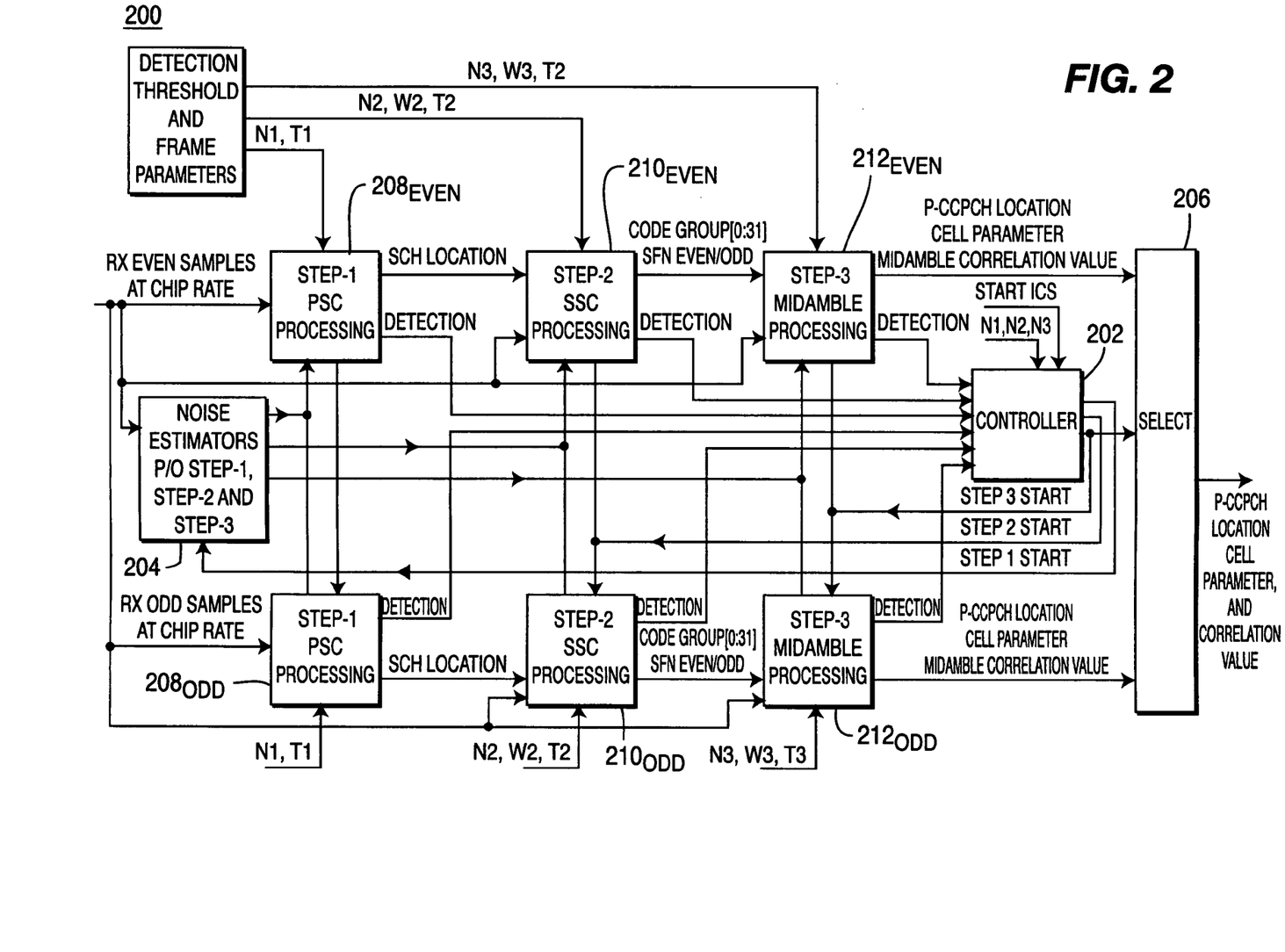
FIG. 2 is a block diagram of initial cell search.

Referring initially to FIG. 2, a block diagram 200 of initial cell search (ICS) is shown. Input to an initial cell search is supplied by a receiver root raised cosine filter (Rx-RRC) at twice the chip rate. Typically, there are 38,400 chips in a frame so receiving the input at twice the chip rate provides 76,800 samples. The 76,800 samples are divided into two groups, preferably odd and even. The even samples and odd samples are processed by an identical sequence of processing steps, as shown in FIG. 2.

The sequence of steps are: step 1 or primary synchronization code (PSC) processing for determining the location of the synchronization channel (SCH) (i.e. chip offset); step 2 or secondary synchronization code (SSC) processing for determining the code group (i.e. the group of cells in which the cell corresponding to the detected PSC corresponds) and timeslot synchronization based on $t_{offset}$ (which is code group specific) and the chip offset provided in step 1; and step 3 or midamble processing for determining the parameters of the cell that corresponds to the detected PSC. Steps 1, 2, and 3 of initial cell search are run for each group of samples at a particular frequency. If there is no detection at a particular frequency, initial cell search is run again at another frequency.

A controller 202 is provided for coordinating the processing of the three steps. Noise estimators 204 and detection threshold and frame parameters (N, W, T) are provided for each step. While any parameters may be specified, it is preferable to specify a number of frames (N) accumulated before reset, a noise threshold coefficient (T), and a search window size (W) expressed in chips. It is noted that no search window size (W) needs to be specified for step 1 since the entire frame is being searched. N1 is the number of frames that step 1 is run. N1 is preferably 4. N2 is the number of frames that step 2 is run. N2 is preferably 8. N3 is the number of frames that step 3 is run. N3 is preferably 4. T1, T2, and T3 are different threshold coefficients based on a false alarm rate.

The outputs of step 3 processing are input to a selection block 206, which produces the final output of initial cell search. The outputs of step 3 identify the base station that the WTRU performing the initial cell search should synchronize with. More specifically, the outputs are the code group, cell parameter, the case number, and relative locations of slots k and k+8 for case 2, and the midamble correlation value. As mentioned, midamble processing (i.e. step 3) has even and odd processing; therefore, two correlated results are generated for each stream. The midamble correlation values are the correlated results are generated for each stream. The selection block 206 selects between the two step 3 outputs and provides the final output of the initial cell search. The selection made in selection block 206 is between even and odd maximum values. The obtained correlation results belong to four different basic midamble codes. The maximum value is determined between the even and odd results. Once a decision is made between the even and odd results, the corresponding basic midamble is determined. Also, the first significant path (i.e. the path passing the threshold first in time) is determined based on the correlated results.

More specifically, still referring to FIG. 2, an initial cell search begins with a command to the initial cell search controller 202. The initial cell search controller 202 processes this command and sends a 'Step-1 Start' command signal to step-1 block 208 and the noise estimation block 204. After step-1 is completed, the step-1 block 208 sends a 'Success/Failure' signal to the initial cell search controller. A 'Success' signal will cause initial cell search controller to send a 'Step-2' start signal to the step-2 block 210, at which point in time the step-1 block 208 will stop processing the input signal. A 'Failure' signal will cause the initial cell search controller to relay the signal outside the ICS block 200, so that the input signal amplification is increased and/or the carrier frequency is changed. After step-2 processing is complete, a 'Done' signal is sent by the step-2 block 210 to the initial cell search controller 202, which in turn sends a 'Start Step-3' signal to the step-3 block 212. At the same time, the step-2 block 210 will stop its processing. When step-3 processing is completed, the final selection process is done and the final outputs of the ICS are produced thereby completing the ICS process.

It is noted that another way of selecting the final output is to combine the even and odd output after each step and choose the better of the two for the remaining steps. If either the even or odd processing path fails after the step 1 block 208, then an appropriate failure flag is generated. Subsequent processing will continue in a successful path. In this case, after step 3, the select box 206 will select the result provided by this path.

Figure 3:
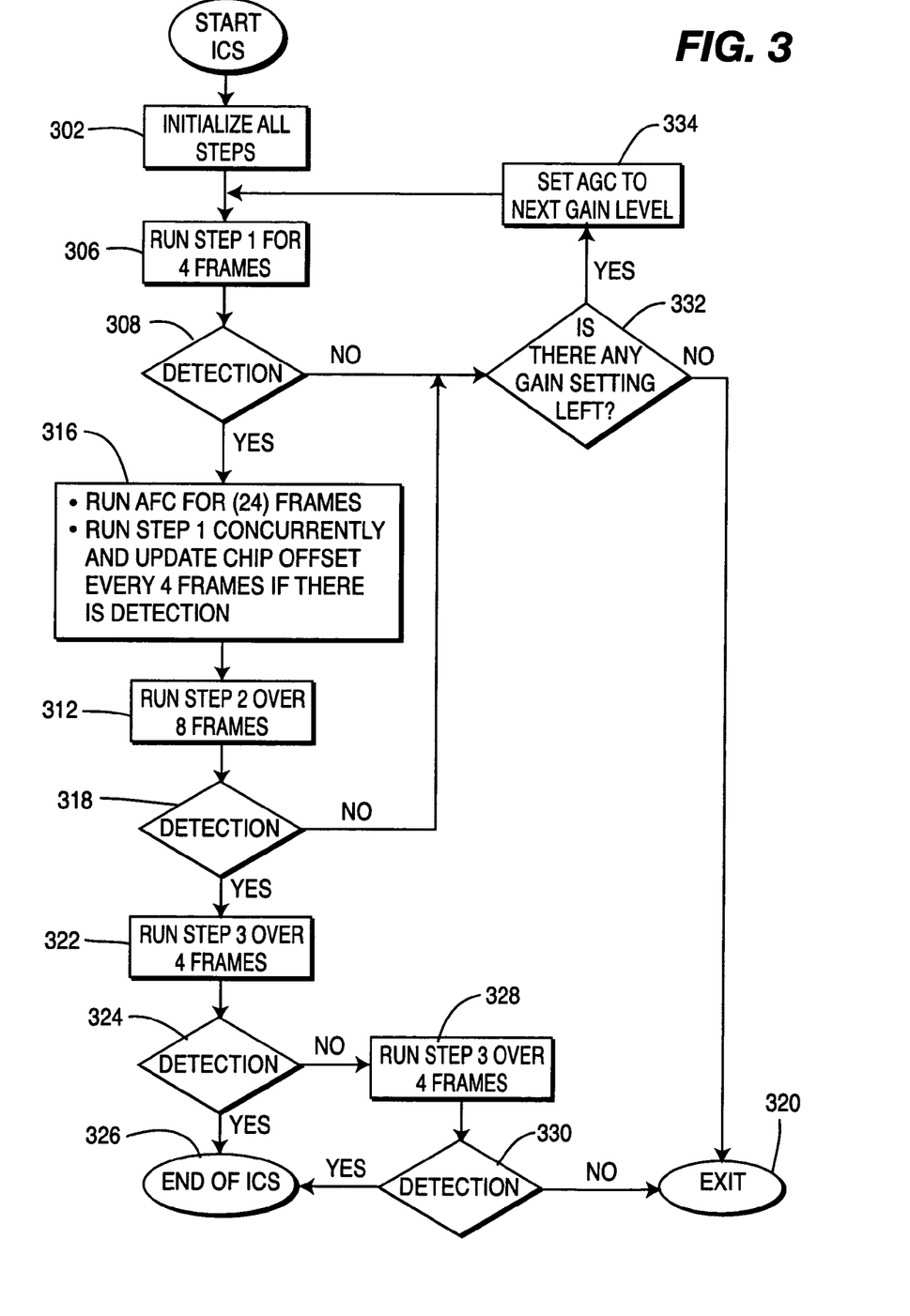
FIG. 3 is a logic diagram of initial cell search.

Referring now to FIG. 3, there is shown a method 300 for performing initial cell search. The method 300 begins in step 302 with initialization of all steps of initial cell search (i.e. steps 1, 2, and 3 of initial cell search). Next, in step 306, step 1 of initial cell search is run for preferably four frames. Of course, it may be run for any number of frames as desired. As previously explained, in step 1 of initial cell search, the WTRU is looking for the PSC correlator peak location with the highest power.

In step 308, it is determined whether there is a detection of a PSC or not. If there is a detection of a PSC, the method 300 proceeds to step 316. In step 316, an AFC algorithm is run for preferably twenty four frames to reduce, preferably to 2 kHz, any offset between frequencies in the WTRU and base station. From step 316, the method 300 proceeds to step 312 where step 2 of initial cell search is run for eight frames.

From step 312, the method 300 proceeds to step 318 to determine if there has been a detection of the SSCs. If there is a detection, step 3 of initial cell search is run for four frames (step 322). As previously explained, in step 3 of initial cell search, the scrambling code and unique midamble base station identification number are determined. In step 324, it is determined whether there was a detection while running step 3 of initial cell search. If there was a detection, the method 300 ends in step 326. In there was no detection, step 3 is run for another four frames in step 328. In steps 322 and 328, four frames is preferred, but step 3 may be run over any number of frames as desired. If there is a detection (step 330), the method 300 ends in step 326. If not, there is a failure and the method 300 ends in step 320.

Referring again to steps 308 and 318, if there is no detection in step 1 or step 2, the method 300 proceeds to step 332. In step 332, it is determined whether there are any gain settings left. If there are no gain settings left, there is a failure and the method 300 ends in step 320. If there are additional gain settings left, the method 300 proceeds to step 334 where the automatic gain controller (AGC) of the WTRU is set to the next gain setting. By way of explanation, the gain setting is the amount an analog signal is amplified before being put into an analog-to-digital converter. There are typically four gain settings and the one that is used first is typically the highest. Therefore, in step 334, the automatic gain controller (AGC) will preferably be set to the next lowest gain setting. Once the AGC is set to the next gain setting, the method 300 proceeds to step 306 and continues as described above.

Figure 4:
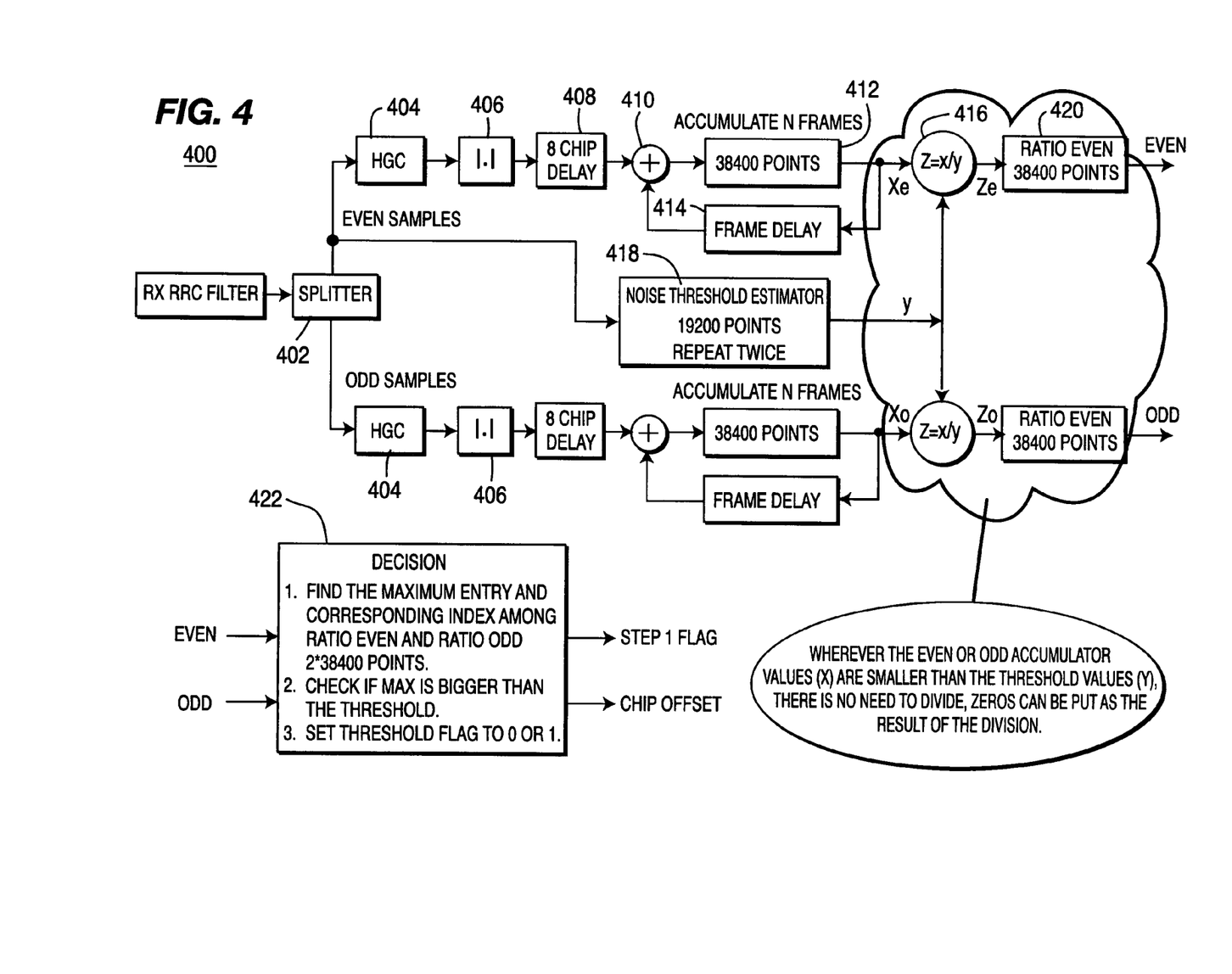
FIG. 4 is a block diagram of step 1 of initial cell search.

Referring now to FIG. 4, there is shown a block diagram 400 for step 1 of initial cell search. The purpose of step 1 is to find the strongest path over a frame worth of samples the WTRU has detected and determine the chip offset (i.e. location) of the strongest path. As mentioned above, the input signal is sampled at twice the chip rate and split or demultiplexed by a splitter 402 to produce even and odd samples.

Once the sampled signal is split by the splitter 402, the even and odd samples are passed to Hierarchical Golay Correlators (HGC) 404, 406 at the chip rate. Each set of samples are processed in the same fashion so, for the sake of brevity, processing of the even samples is described herein. The HGC 404 is similar to an efficient match filter to the PSC sequence. The HGC 404 performs a correlation between the received signal and the primary synchronization code (PSC) at consecutive chip positions. When the entire PSC is in the HGC 404, a peak is generated. The peak will be generated at the same location within every frame. This is because the PSC is transmitted at the same location within every frame. Of course, in case 2, there will be two PSC locations.

Therefore by passing the PSC through the HGC, a peak is generated at the last chip of the PSC. Therefore to identify the beginning of the PSC, subtract 255 chips from that peak location. This will provide the location of the beginning of the PSC sequence because the PSC is 256 chips long. The output of the HGC 404 is a complex output that is input to an absolute value conversion block 406. It is noted that any method of converting a complex number to a magnitude may be used in block 406. The output of block 406 is the magnitude of the complex number that was output from HGC 404. The magnitude provided by block 406 is input to a delay block 408 that imparts an eight chip delay. The delay is used to align the HGC 404 with respect to the noise threshold estimator 418. This is required, because as shown in FIG. 4, the output of the HGC 404 is eventually divided by an estimate of the noise (which comes in approximately eight chips after the HGC 404 value) so the two values need to be aligned with respect to time.

The output of the eight chip delay block 408 is input to an accumulator 410. Assuming case 1 for purposes of explanation, there is a single PSC per frame in which provides a single peak per frame in slot k. Keeping in mind that everything is in magnitude in the accumulator, once the first frame passes there is a single point having a peak value at a particular location in the frame. This peak value is repeated in subsequent frames at the same location. The accumulator 410 adding entry by entry each point on top of each other. This sums all of the peaks on top of each other to gain immunity against noise because noise cannot add on top of itself as fast as the signal can. This is preferably performed for four frames. To accomplish the summation over four frames, a buffer 412 having 38,400 points (i.e. enough points for an entire frame of 38,400 chips) and a frame delay block 414. The output $X_e$ is a vector having a length of 38,400 points wherein each point in the vector is the summation of the magnitude at each point for four different frames. Therefore, $X_e$ is the signal value for each chip in the typical signal-to-noise ratio (SNR).

To obtain the noise value, which is shown as Y in FIG. 4, the noise estimation of each chip (i.e. Y) is provided by the noise threshold estimator block 418. To obtain the SNR at each chip Xe is divided by Y in divider 416. It is noted that wherever the even or odd accumulator values (i.e. X) are smaller than the threshold values (Y), there is no need to divide and zeros may simply be input as the result of the division. The SNR of each chip is input to a ratio even buffer 420. The buffer has 38,400 points so that it may hold all the chips of a frame. Of course, more or less points may be provided where different frame lengths are used. The chip with the highest SNR value between both the even and odd samples is selected as the location of the PSC. Note, where the peak location is the beginning of the PSC sequence, it may be inputted directly to step 2. If the peak location is the end of the PSC sequence, 255 chips are subtracted from the peak location so that the beginning of the PSC sequence is provided to step 2.

To summarize step 1, reference is made to decision block 422. As explained, even and odd samples are input to step 1. The chip having the maximum SNR and the corresponding index (i.e. the chip location at which the maximum SNR is located; also referred to as peak location) is determined from evaluating all of the even and odd samples. Then a check is performed to ensure that the maximum SNR detected is above a particular threshold. If the maximum SNR is above the threshold there is success and the flag is set to 1. Otherwise, the flag is set to 0. Therefore, the outputs of step 1 are the step 1 flag and the chip offset (i.e. the peak location), which is preferably the beginning of the PSC sequence. As mentioned, where the chip offset corresponds to the end of the PSC sequence, 255 chips should be subtracted from the output prior to beginning step 2.

Figure 5:
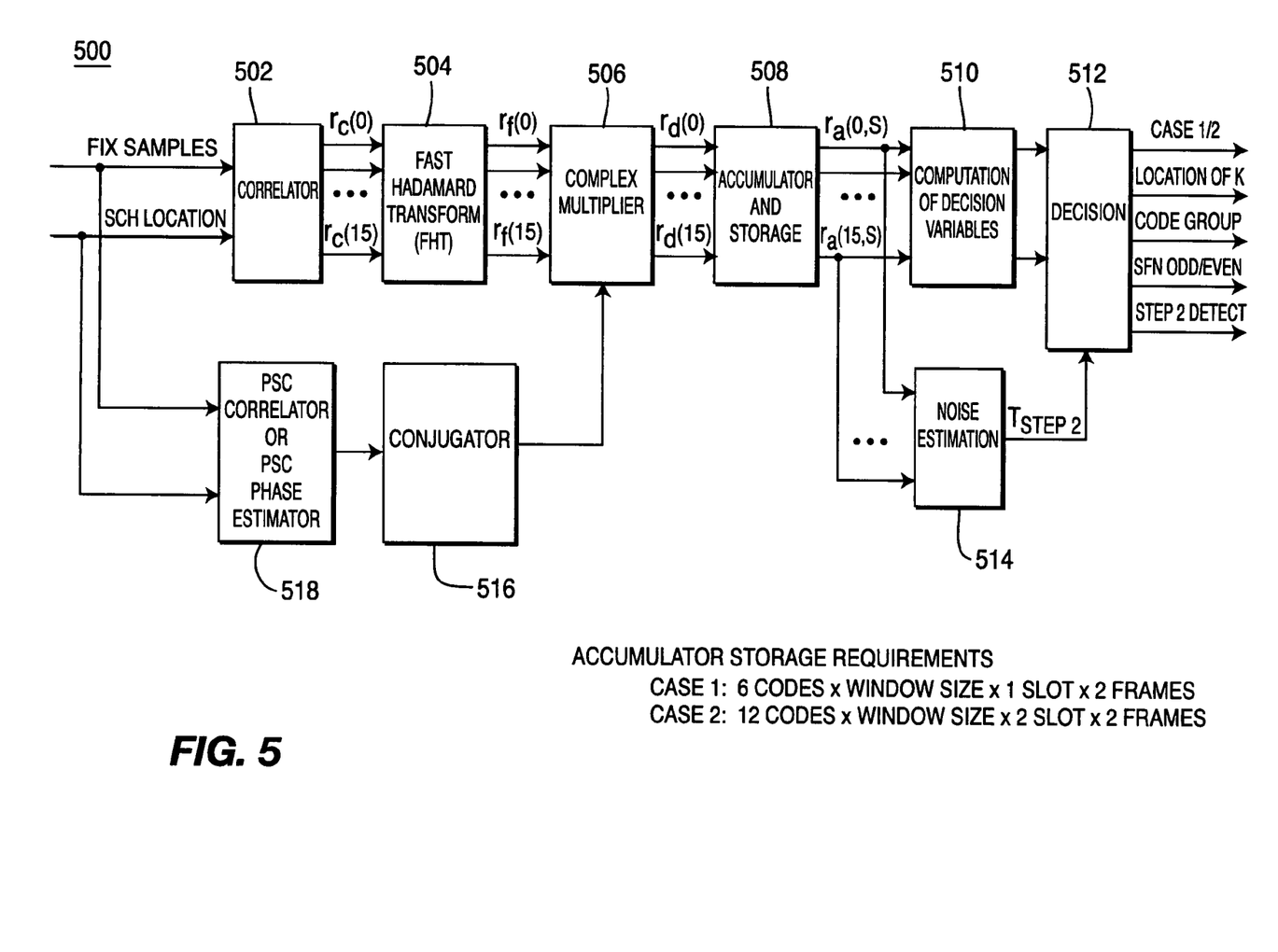
FIG. 5 is a block diagram of step 2 of initial cell search.

Referring now to FIG. 5, there is shown a block diagram 500 of step 2 of initial cell search. Step 2 of initial cell search is used to obtain the scrambling code group number and $t_{offset}$ at the beginning of the slot. The synchronization channel (SCH) location is input to a correlator 502. The SCH location is aligned so that the SCH location input is the beginning of the PSC sequence. The beginning of the PSC sequence may be used as the beginning of the SCH because the SCH is made up of the PSC and three SSCs wherein all four codes (PSC and three SSCs) are located at the same chips in every frame.

Also input to the correlator 502 is all of the chip samples corresponding to the PSC. Note, the chip locations identified in step 1 as corresponding to the PSC are saved to memory so that they may be input to step 2. Therefore, where the samples are input at twice the chip rate, 512 samples are input to correlator 502 and where the samples are input at the chip rate, 256 samples are input to correlator 502. Assume for purposes of describing block diagram 500 that 256 samples are input to correlator 502.

When SSCs are generated, an envelope sequence is applied to the rows of a Hadamard matrix in order to have some orthogonality between the PSC and the SSCs. This envelope has to be removed before proceeding into the remaining portion of step 2. The envelope removal is accomplished by correlator 502.

Once the envelope has been removed from the input signal, the signal is output from the correlator 502 to a Fast Hadamard Transform (FHT) block 504. The FHT block 504 reduces the complexity of the pure Hadamard correlation from a 256×256 matrix to a 16×16 matrix.

The output of the FHT block 504 is preferably multiplied in block 506 by the conjugate of the peak PSC provided by the HGC in step 1. To obtain the conjugate of the peak PSC, the 256 samples and SCH location are input to a PSC correlator/phase estimator 518 and then input to conjugator 516 which takes the conjugate of the peak PSC. The conjugate of the peak PSC is then multiplied by the output of the FHT block 504. As mentioned, this is the preferred embodiment. In another embodiment, the PSC correlator/phase estimator block 518 estimates the phase of the PSC and expresses it as a complex number. The output of PSC correlator/phase estimator block 518 is then input to a conjugator 516 which takes the complex conjugate and inputs it to the complex multiplier 506 where, as explained above, it is multiplied by the output of the FHT block 504.

The output of the complex multiplier block 506 is input to an accumulator and storage block 508. In the complex multiplier block 506 all of the phase uncertainties are removed from the signal. This allows the output of the complex multiplier block 506 to be accumulated and stored coherently in the accumulator and storage block 508. That is, real values may be added on top of real values instead of turning the complex number into a magnitude and then storing them which degrades performance and more importantly in step 2 processing it makes group number detection impossible because the information is carried with complex modulated sequences.

The output of the accumulator and storage block 508 is input to a computation block 510 where the inputs are mapped according to the group number, case information, k or k+8, and the modulation. These values are obtained from a predetermined look-up table and are mapped into decision variables. The mapping is performed using the knowledge obtained in step 1 regarding whether the peak location is at k or k+8. The optimal decision variables are compared with a noise estimation provided by noise estimation block 512 and the location of k and the code group is determined. It is noted that in case 2, the location may be the location of k+8. In addition to the location of k and the code group, indications are provided that specify case 1 or case 2, the system frame number (SFN) (i.e. whether the detection was made based on an odd or even frames), and whether a step 2 detection has occurred.

Figure 6:
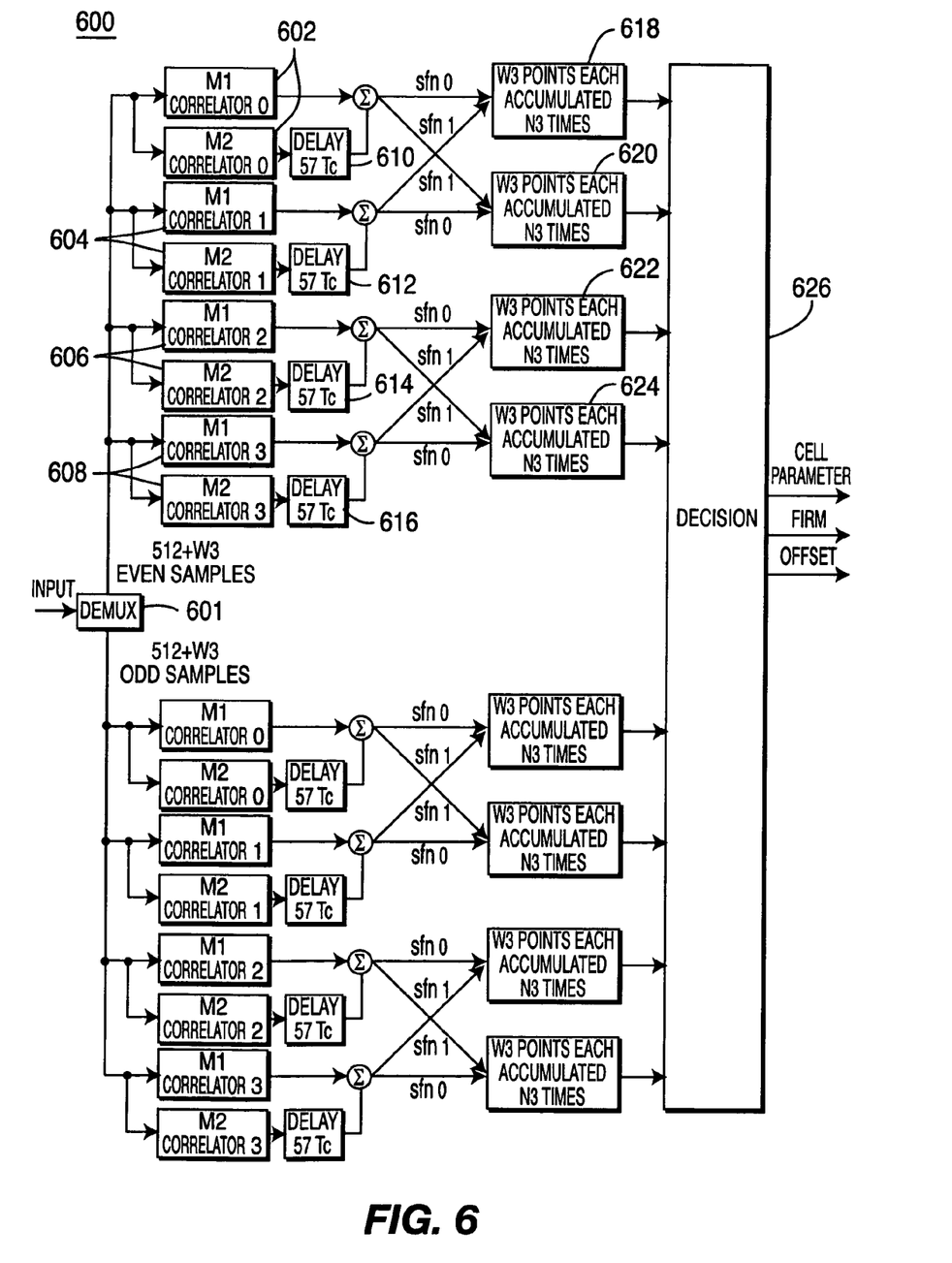
FIG. 6 is a block diagram of step 3 of initial cell search

Referring now to FIG. 6, a block diagram 600 is shown for step 3 of initial cell search. Again, the incoming communication signal is provided by the RX-RRC at the twice the chip rate and split into odd and even samples. Again, for sake of brevity, only the even samples are described herein because even and odd processing is identical. At this point, the beginning of the slot and code group are known and the goal is to identify a particular cell with which to synchronize. The code group is associated with four basic midambles and each basic midamble is associated with two midambles M1 and M2. Therefore, a correlator is provided for each set of midambles M1 and M2. That is, correlator 0 602 is provided for the first set of midambles, correlator 1 604 is provided for the second set of midambles, correlator 2 606 is provided for the third set of midambles, and correlator 3 608 is provided for the fourth set of midambles. By way of explanation each correlator relates to a particular base station (or cell) and the goal is to choose the best base station with which to synchronize. It is noted that it is assumed that transmit diversity is being used so that each antenna of a base station may use a different midamble. It is also noted that midambles M1 and M2, which are transmitted at the same time on top of each other, are purely for synchronization purposes and are not used for traffic.

As in step 1, when the midamble is completely within the correlator, there is a peak. A delay of 57 chips is imparted on the M2 correlators to align M1 and M2 on top of each other and the two peaks are summed. When summing the peaks, it is preferable to alternate between correlators. Therefore, it is important to use the SFN value obtained in step 2. With respect to buffer 618 for example, where the SFN is 0, the output of correlator 0 602 is input to buffer 618. Where the SFN is 1, the output of correlator 1 604 is input to buffer 618. This ensures that the peaks are added as opposed to being mixed and ensure alternation of the midambles. If, however, the same midamble is generated at each frame, the alternation is not required.

Assuming buffer sizes of 100 points, magnitudes are provided for 400 points for even processing and 400 points for odd processing for a total of 800 points. Therefore in decision block 626, of the 800 points, the point with the maximum magnitude is selected. Then, also preferably in the decision block, it is determined which buffer (i.e. accumulator) generated the point with the maximum magnitude. Once the buffer is identified, the SFN is used to identify the correlator from which the maximum magnitude originated. For example, where correlator 0 602 is identified, the cell parameter (i.e. cell identification) that corresponds to correlator 0 602 is provided as the cell parameter output. The cell identification provides the scrambling code of the identified cell. Based on a comparison of the signal strength of the detected midamble and a noise estimate, an indication of FIRM may be provided. That is, where the signal strength is sufficient with respect to the noise estimate, a FIRM indication is provided. With respect to the offset, it is preferable for the offset that is provided be the location of the beginning of the channel response. By identifying the beginning of the channel response, the WTRU performing the initial cell search knows the time at which to begin reading the identified cell's beacon and is able to then synchronize with the cell and begin communicating.

It is noted that decision blocks, correlators, conjugators, dividers, etc. shown throughout the figures represent, where applicable, appropriate processing means within a WTRU. The processing means may be any number of processors, as desired.

It is important to note that the present invention may be implemented in any type of wireless communication system employing any type of time division duplex (TDD) technology, as desired. By way of example, the present invention may be implemented in UMTS-TDD, TDSCDMA, or any other type of wireless communication system. Further, while the present invention has been described in terms of various embodiments, other variations, which are within the scope of the invention as outlined in the claim below will be apparent to those skilled in the art.

What is claimed is:

1. A method for wireless communication initiation implemented in a wireless transmit/receive unit (WTRU) configured to communicate with base stations of a wireless system where the WTRU receives an identifying synchronization channel (SCH) signal from at least one base station at a predetermined chip rate in a selected portion of a system time frame, comprising:
   receiving a wireless signal including at least one SCH signal, wherein the SCH signal has been transmitted in a predetermined timeslot of a system time frame and includes a primary synchronization code (PSC) transmitted in the timeslot at a predetermined chip offset wherein the decoding includes determining a $t_{offset}$ at which the selected SCH is transmitted;
   identifying received SCH signals using a power threshold based on a plurality of chip samples sampled at twice the chip rate;
   selecting an identified SCH signal for decoding;
   decoding the selected SCH signal to determine system time frame timing and base station identity by determining a beginning of the SCH signal by identifying a chip location having a highest signal to noise ratio wherein the noise is computed using a predetermined number of chips that is less than the total number of chips in a frame; and
   identifying whether the chip location of the PSC sequence was derived from an even sample or an odd sample where the PSC sequence is identified by processing a wireless communication signal at twice the chip rate.

2. The method of claim 1 wherein the PSC having the highest power is detected by summing the peak PSC over four frames and dividing the summed power by an estimated noise value to obtain an signal to noise ratio for each chip in a frame.

3. The method of claim 2 wherein the step of dividing is not implemented where the signal value is less than the threshold value.

4. The method of claim 1 wherein the chip with the highest signal to noise ratio is selected to obtain the location of the PSC sequence.

5. The method of claim 4 wherein the location of the PSC sequence is adjusted to identify the chip location at which the PSC sequence begins.

6. A wireless transmit/receive unit (WTRU) configured to communicate with base stations of a wireless system where the WTRU has received an identifying synchronization channel (SCH) from at least one base station in a selected portion of a system time frame, comprising:
   a receiver configured to receive a wireless signal including at least one SCH signal, wherein the SCH signal has been transmitted in a predetermined timeslot of a system time frame and includes a primary synchronization code (PSC) transmitted in the timeslot at a predetermined chip offset wherein the decoding includes determining a $t_{offset}$ at which the selected SCH is transmitted;
   at least one correlator configured to identify received SCH signals using a power threshold based on a plurality of chip samples sampled at twice the chip rate;
   a processor configured to select an identified SCH signal for de coding;
   a processor configured to decode the selected SCH signal to determine system time frame timing and base station identity by determining a beginning of the SCH signal by identifying a chip location having a highest signal to noise ratio wherein the noise is computed using a predetermined number of chips that is less than the total number of chips in a frame; and
   circuitry configured to identify whether the chip location of the PSC sequence was derived from an even sample or an odd sample where the PSC sequence is identified by processing a wireless communication signal at twice the chip rate.

* * * * *

UNITED STATES PATENT AND TRADEMARK OFFICE
CERTIFICATE OF CORRECTION

PATENT NO. : 7,444,144 B2  Page 1 of 1
APPLICATION NO. : 10/772644
DATED : October 28, 2008
INVENTOR(S) : Demir et al.

It is certified that error appears in the above-identified patent and that said Letters Patent is hereby corrected as shown below:

TITLE PAGE IN THE ABSTRACT

At section (57), ABSTRACT, page 1, right column, line 2, after the words "processing is" delete "preformed" and insert therefor --performed--.

IN THE SPECIFICATION

At column 2, line 22, after the word "serving" delete "networks" and insert therefor --network's--.

At column 2, line 32, after the word "also" delete "provides" and insert therefor --provide--.

At column 3, line 22, after the words "processing is" delete "preformed" and insert therefor --performed--.

At column 4, line 30, after the word "results" insert --and--.

At column 6, line 19, before the words "which provides" delete "in".

At column 8, line 5, after the word "even" delete "frames)," and insert therefor --frame),--.

At column 8, line 9, before the words "twice the" delete "the".

Signed and Sealed this

Tenth Day of March, 2009

JOHN DOLL
*Acting Director of the United States Patent and Trademark Office*